US012675150B2

(12) United States Patent
Kim et al.

(10) Patent No.: US 12,675,150 B2
(45) Date of Patent: Jul. 7, 2026

(54) STORAGE PACKAGE, STORAGE DEVICE AND METHOD FOR OPERATING THE STORAGE DEVICE

(71) Applicant: SAMSUNG ELECTRONICS CO., LTD., Suwon-si (KR)

(72) Inventors: Ji Hong Kim, Seongnam-si (KR); Suck Hyun Park, Suwon-si (KR); Byung Woo Nam, Hwaseong-si (KR); Ki Hyun Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1049 days.

(21) Appl. No.: 17/709,580

(22) Filed: Mar. 31, 2022

(65) Prior Publication Data

US 2023/0068365 A1 Mar. 2, 2023

(30) Foreign Application Priority Data

Aug. 24, 2021 (KR) ........................ 10-2021-0111684

(51) Int. Cl.
G06F 1/329 (2019.01)
G06F 1/20 (2006.01)

(52) U.S. Cl.
CPC .............. G06F 1/329 (2013.01); G06F 1/203 (2013.01)

(58) Field of Classification Search
CPC .................................................. G11B 33/144
See application file for complete search history.

(56) References Cited

U.S. PATENT DOCUMENTS

| | | | |
|---|---|---|---|
| 9,436,236 B2 | 9/2016 | Ito et al. | |
| 9,506,821 B1 * | 11/2016 | Robillard | ............... G01K 7/427 |
| 9,693,483 B2 | 6/2017 | Iwasaki | |
| 10,073,504 B2 | 9/2018 | Nakanishi et al. | |
| 10,209,750 B2 | 2/2019 | Marripudi et al. | |
| 10,806,050 B1 | 10/2020 | Chou | |
| 2005/0055474 A1 | 3/2005 | Yang | |

(Continued)

FOREIGN PATENT DOCUMENTS

| | | |
|---|---|---|
| JP | 2012-181588 A | 9/2012 |
| KR | 10-2002-0060917 A | 7/2002 |

(Continued)

*Primary Examiner* — Nathan L Laughlin
(74) *Attorney, Agent, or Firm* — Wolf, Greenfield & Sacks, P.C.

(57) ABSTRACT

A storage package, a storage device, and a method for operating a storage device are provided. A storage package includes a fan, a display device, and a storage device which includes a non-volatile memory, and is configured to output a control signal based on a temperature of the storage device or an indication of whether a memory operation is scheduled to be executed on the non-volatile memory. The storage device includes a control circuit configured to control an operation the fan and/or the display device based on the control signal, and is configured to control the display device to output light with different colors according to first to third temperature ranges of the temperature of the storage device. The control circuit is configured to operate the fan to cool the storage device responsive the storage device exceeding a preset reference temperature, or responsive to scheduled memory operations.

18 Claims, 9 Drawing Sheets

(56) References Cited

U.S. PATENT DOCUMENTS

| | | | | |
|---|---|---|---|---|
| 2006/0045168 | A1* | 3/2006 | Socci | G01K 7/42 |
| | | | | 374/E7.042 |
| 2010/0066279 | A1* | 3/2010 | Frankel | H02P 3/22 |
| | | | | 318/379 |
| 2018/0026910 | A1* | 1/2018 | Balle | G06F 3/0665 |
| 2018/0260007 | A1* | 9/2018 | Ping | G11B 33/142 |
| 2019/0390864 | A1* | 12/2019 | Lambert | F24F 11/52 |
| 2020/0301489 | A1 | 9/2020 | Ping | |
| 2020/0365957 | A1* | 11/2020 | Nishikawa | H01M 10/48 |

FOREIGN PATENT DOCUMENTS

| | | |
|---|---|---|
| KR | 10-2007-0075733 | 7/2007 |
| KR | 10-2018-0104547 A | 9/2018 |

* cited by examiner

STORAGE PACKAGE, STORAGE DEVICE AND METHOD FOR OPERATING THE STORAGE DEVICE

CROSS REFERENCE TO RELATED APPLICATION

This application claims priority under 35 USC § 119 to Korean Patent Application No. 10-2021-0111684, filed on Aug. 24, 2021 in the Korean Intellectual Property Office, the disclosure of which is incorporated by reference herein in its entirety.

TECHNICAL FIELD

The present disclosure relates to a storage package, a storage device, and a method for operating the storage device.

DISCUSSION OF THE RELATED ART

A storage device including an SSD (Solid State Drive) is a device that can receive data from a host and store the data. Such storage devices are widely used in conventional electronic devices such as desktop PCs, tablet PCs, and laptop PCs, as well as other electronic devices included in a vehicle such as an automobile, a drone, and an aircraft.

Many storage devices are designed to operate continuously. However, as the operation of the storage device continues, the temperature of the storage device may rise. As a result, defects may occur in the storage device, such as connection failures or missed operations. Such defects of the storage device adversely affect the reliability of the memory system.

SUMMARY

Aspects of the present disclosure provide a storage package having increased operating performance.

Aspects of the present disclosure also provide a storage device having increased operating performance.

Aspects of the present disclosure also provide a method for operating a storage device having increased operating performance.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

A storage package according to aspects of the present disclosure includes a fan, a display device, and a storage device which includes a non-volatile memory, and is configured to output a control signal based on a temperature of the storage device or on an indication of scheduled memory operations on the non-volatile memory, wherein the storage device includes a control circuit configured to control an operation of the fan or the display device based on the control signal, wherein the control circuit is configured to control the display device to output light having different colors, each color corresponding to one of first to third temperature sections responsive to the temperature of the storage device being within a range of any one of the first to third temperature sections, and wherein the control circuit is configured to operate the fan to cool the storage device responsive to the temperature of the storage device exceeding a preset reference temperature or responsive to a command to perform the memory operation on the non-volatile memory.

A storage device according to aspects of the present disclosure includes a non-volatile memory, a storage controller, and a temperature sensor configured to measure a temperature of the storage device and output temperature information, wherein the storage controller includes a task scheduler configured to output access information indicating that a memory operation on the non-volatile memory is scheduled to be executed, the access information output in response to a command for executing the memory operation on the non-volatile memory, and wherein a general purpose input output module (GPIO module) configured to output a control signal to control an operation of a fan or a display device, responsive to a temperature of the storage device exceeding a preset reference temperature and/or to the output of the access information.

A method for operating a storage device according to aspects of the present disclosure includes providing a storage device which includes a non-volatile memory, and is configured to output a control signal based on a temperature of the storage device, on an indication of scheduled memory operations on the non-volatile memory, providing a fan which is operated based on the control signal, checking whether the storage device and the fan are connected, modifying a power state of the storage device based on whether the fan is connected, and determining whether a temperature management feature (HCTM feature: HCTM Feature; Host Controlled Temperature Management) of the host on the storage device operates based on whether the fan is connected.

Other features and embodiments may be apparent from the following detailed description, the drawings and the claims.

BRIEF DESCRIPTION OF THE DRAWINGS

These and/or other aspects will become apparent and more readily appreciated from the following description of the embodiments, taken in conjunction with the accompanying drawings in which:

FIG. 4 is a block diagram of the method of controlling a fan and a display device by the operation of the storage device according to some embodiments.

FIG. 6 is a diagram of the operation of the display device according to some embodiments.

FIG. 7 is a diagram of the storage package including the storage device according to some embodiments.

DETAILED DESCRIPTION OF THE EMBODIMENTS

Figure 1:
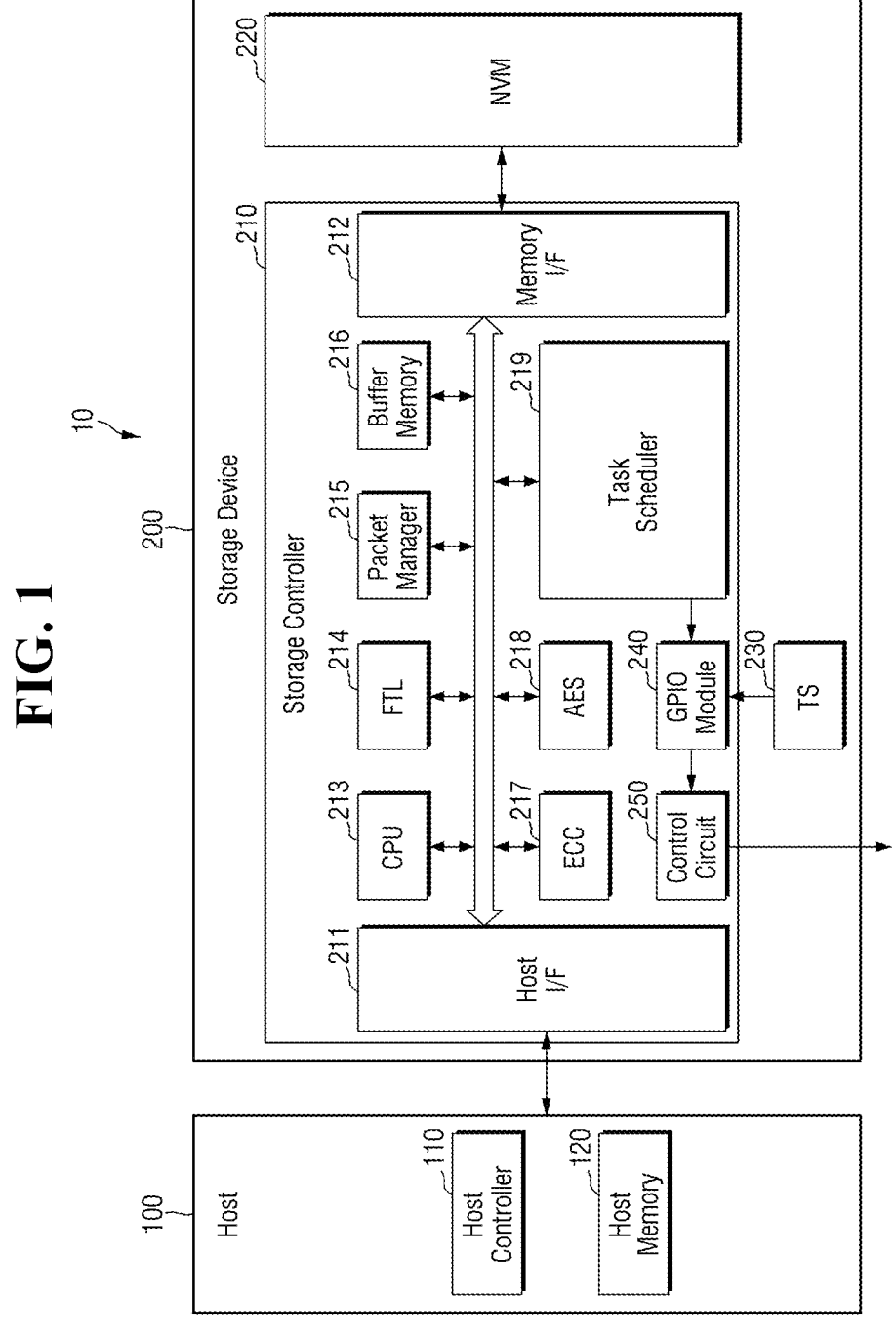
FIG. 1 is a block diagram that shows a host-storage system according to some embodiments.

Hereinafter, embodiments according to the technical idea of the present disclosure will be described referring to the accompanying drawings.

To minimize the defects caused by high temperatures in a storage device and to maintain the reliability of the system, conventional systems have included a fan for cooling the storage device and various techniques for controlling the fan from external hardware. However, often these techniques controlled by an external system are applied to reduce the risen temperature after rise of the storage device or, may inaccurately sense the temperature of the storage device due to relying on hardware that is being disposed externally to the device. Accordingly, they may not aid in improving the reliability of the memory system.

Throughout the specification, like reference symbols in the drawings may denote like elements, and to the extent that a description of an element has been omitted, it may be understood that the element is at least similar to corresponding elements that are described elsewhere in the specification.

FIG. 1 is a block diagram that shows a host-storage system according to some embodiments.

A host-storage system 10 may include a host 100 and a storage device 200. The storage device 200 may also include a storage controller 210 and a non-volatile memory (NVM) 220. Further, in some embodiments, the host 100 may include a host controller 110 and a host memory 120. The host memory 120 may function as a buffer memory for temporarily storing the data to be transmitted to the storage device 200 or the data transmitted from the storage device 200.

The storage device 200 may include storage medium for storing data in response to a request from the host 100. For example, the storage device 200 may include an SSD (Solid State Drive), an embedded memory, and/or a detachable external memory. When the storage device 200 is an SSD, the storage device 200 may be a device that that complies with an NVMe (non-volatility memory express) standard.

When the storage device 200 is an embedded memory or an external memory, the storage device 200 may be a device that complies with a UFS (Universal Flash Storage) or an eMMC (Embedded Multimedia Card) standard. The host 100 and the storage device 200 may each generate and transmit packets according to the adopted standard protocols.

When the non-volatile memory 220 of the storage device 200 includes a flash memory, such a flash memory may include a 2D NAND memory array or a 3D (e.g., vertical) NAND (VNAND) memory array. As another example, the storage device 200 may include various other types of non-volatile memories. For example, the storage device 200 may include a MRAM (Magnetic RAM), a spin-transfer torque MRAM, a Conductive bridging RAM (CBRAM), a FeRAM (Ferroelectric RAM), a PRAM (Phase RAM), a resistive memory (Resistive RAM), and/or other various types of memory.

In some embodiments, the host controller 110 and the host memory 120 may be implemented as separate semiconductor chips. Alternatively, in some embodiments, the host controller 110 and the host memory 120 may be integrated on the same semiconductor chip. As an example, the host controller 110 may be any one of a plurality of modules included in an application processor, and such an application processor may be implemented as a system on chip (SoC). Further, the host memory 120 may be an embedded memory provided inside the application processor, or may be a non-volatile memory or a memory module placed outside the application processor.

The host controller 110 may manage operations of storing data (e.g., write data) of the buffer region in the non-volatile memory 220 and operations of storing data (e.g., read data) of the non-volatile memory 220 in the buffer region.

The storage controller 210 may include a host interface 211, a memory interface 212, and a CPU (central processing unit) 213. Further, the storage controller 210 may further include a flash translation layer (FTL) 214, a packet manager 215, a buffer memory 216, an ECC (error correction code) 217 engine, an AES (advanced encryption standard) engine 218, a task scheduler 219, a general purpose input output module (GPIO) 240, and a control circuit 250.

The storage controller 210 may further include a working memory into which a flash translation layer (FTL) 214 is loaded, and the CPU 213 may execute the flash translation layer 214, thereby controlling the data read and write operations on the non-volatile memory.

The host interface 211 may send and receive packets to and from the host 100. The packet transmitted from the host 100 to the host interface 211 may include a command or data to be written in the non-volatile memory 220, and the packet transmitted from the host interface 211 to the host 100 may include a response to a command, data read from the non-volatile memory 220, and the like.

The memory interface 212 may transmit the data to be written on the non-volatile memory 220 to the non-volatile memory 220 or receive the data that is read from the non-volatile memory 220. Such a memory interface 212 may be implemented to comply with standard protocols such as Toggle or ONFI.

The flash translation layer 214 may perform various functions such as address mapping, wear-leveling, and garbage collection. The address mapping operation is an operation that includes changing a logical address received from a host into a physical address which is used for actually storing the data in the non-volatile memory 220. The wear-leveling is a technique for allowing blocks in the non-volatile memory 220 to be used uniformly to prevent an excessive degradation of a particular block, and may be implemented, for example, through a firmware technique of balancing the erasure counts of the physical blocks. The garbage collection is a technique for ensuring an available capacity in the non-volatile memory 220, and may include operations such as copying the valid data of the block to a new block and then erasing the existing block.

The packet manager 215 may generate a packet according to the protocol of the interface discussed with the host device 100, or may parse various types of information from the packet received from the host device 100. Further, the buffer memory 216 may temporarily store the data to be recorded in the non-volatile memory 220 or the data to be read from the non-volatile memory 220. The buffer memory 216 may be provided inside the storage controller 210, or may be placed outside the storage controller 210.

An ECC engine 217 may perform error detection and correction functions on the read data that is read from the non-volatile memory 220. More specifically, the ECC engine 217 may generate parity bits on the write data to be written on the non-volatile memory 220, and the parity bits thus generated may be stored in the non-volatile memory 220 together with the write data. When reading the data from the non-volatile memory 220, the ECC engine 217 may correct an error of the read data, using the parity bits that are read from the non-volatile memory 220 together with the read data, and output the read data with the error corrected.

The AES engine 218 may perform encryption and/or decryption operations of the data which are input to the storage controller 210, using, for example, a symmetric-key algorithm.

The task scheduler 219 may receive commands through the host interface 211. The task scheduler 219 may receive commands for performing the internal operation of the storage device 200. The task scheduler 219 may output access information instructing that the memory operation of the non-volatile memory 220 is scheduled to be executed in response to the received command.

The temperature sensor 230 may sense the temperature of the storage device 200 and provide the sensed temperature information to the storage controller 210. For example, the temperature sensor 230 may sense the operating temperature of the storage device 200 and/or the ambient environment temperature of the storage device 200, and provide the sensed temperature information to the storage controller 210. In FIG. 1, although the temperature sensor 230 is illustrated outside the storage controller 210, the embodiments are not limited thereto. That is, the temperature sensor 230 may be included in the storage controller 210.

The general purpose input output module 240 may include a plurality of pins for receiving the signal or outputting a signal. The general purpose input output module 240 may be provided with access information from the task scheduler 219. The general purpose input output module 240 may be provided with temperature information from the temperature sensor 230. The general purpose input output module 240 may output a control signal based on provided access information and temperature information, and may provide the output control signal to the control circuit 250.

The control circuit 250 may receive the control signal from the general purpose input output module 240. The control circuit 250 may control the operation of the fan and the display device which are outside the storage device 200, using a provided control signal Sgn_CONT. The specific contents thereof will be described later. The display device may include, for example, an LED or other display element configured to indicate the performance and/or the temperature of the storage device 200.

Figure 2:
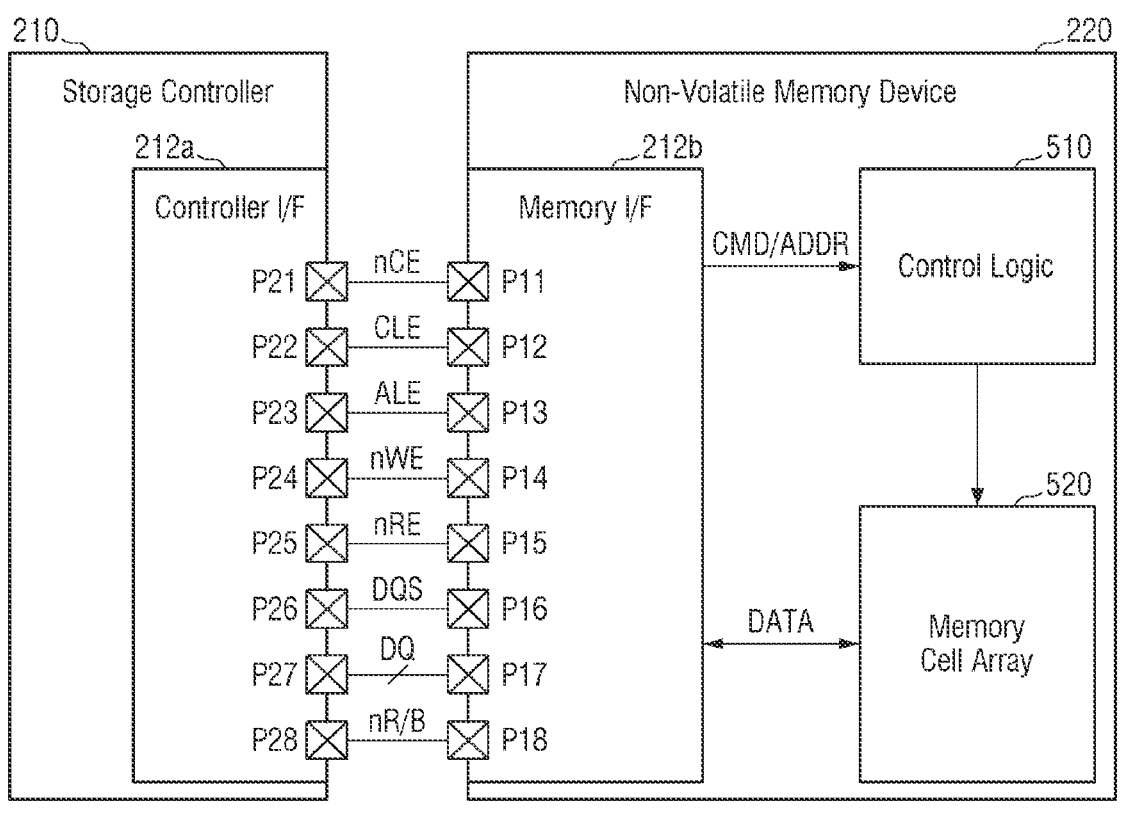
FIG. 2 is a diagram that shows the storage controller, the memory interface, and the non-volatile memory of FIG. 1 in a reconfigured manner.

FIG. 2 is a diagram that shows the storage controller, the memory interface, and the non-volatile memory of FIG. 1 in a reconfigured manner. The memory interface 212 of FIG. 1 may include a controller interface circuit 212a and a memory interface circuit 212b of FIG. 2.

The non-volatile memory 220 may include first to eighth pins P11 to P18, a memory interface circuit 212b, a control logic circuit 510, and a memory cell array 520.

The memory interface circuit 212b may receive a chip enable signal nCE from the storage controller 210 through a first pin P11. The memory interface circuit 212b may transmit and receive signals to and from the storage controller 210 through second to eighth pins P12 to P18 in accordance with the chip enable signal nCE. For example, when the chip enable signal nCE is in an enable status (e.g., a low level), the memory interface circuit 212b may transmit and receive signals to and from the storage controller 210 through second to eighth pins P12 to P18.

The memory interface circuit 212b may receive a command latch enable signal CLE, an address latch enable signal ALE, and a write enable signal nWE from the storage controller 210 through second to fourth pins P12 to P14. The memory interface circuit 212b may receive the data signal DQ from the storage controller 210 or transmit the data signal DQ to the storage controller 210 through a seventh pin P17. The command CMD, the address ADDR, and the data DATA may be sent through the data signal DQ. For example, the data signal DQ may be sent through a plurality of data signal lines. In this case, the seventh pin P17 may include a plurality of pins corresponding to the plurality of data signals.

The memory interface circuit 212b may acquire the command CMD from the data signal DQ that is received in an enable section (e.g., a high level status) of the command latch enable signal CLE based on toggle timings of the write enable signal nWE. The memory interface circuit 212b may acquire the address ADDR from the data signal DQ that is received in the enable section (e.g., a high level status) of the address latch enable signal ALE based on the toggle timings of the write enable signal nWE.

In some embodiments, the write enable signal nWE holds a static status (e.g., a high level or a low level) and then may toggle between the high level and the low level. For example, the write enable signal nWE may toggle during the section in which the command CMD or the address ADDR is transmitted. Accordingly, the memory interface circuit 212b may acquire the command CMD or the address ADDR based on the toggle timings of the write enable signal nWE.

The memory interface circuit 212b may receive the read enable signal nRE from the storage controller 210 through a fifth pin P15. The memory interface circuit 212b may receive a data strobe signal DQS from the storage controller 210 through a sixth pin P16, or may transmit the data strobe signal DQS to the storage controller 210.

In a data DATA output operation of the non-volatile memory 220, the memory interface circuit 212b may receive a toggling read enable signal nRE through the fifth pin P15 before output of the data DATA. The memory interface circuit 212b may generate the toggling data strobe signal DQS based on toggling of the read enable signal nRE. For example, the memory interface circuit 212b may generate the data strobe signal DQS such that the data strobe signal DQS starts to toggle after a predetermined delay (e.g., tDQSRE) based on a toggling start time of the read enable signal nRE. The memory interface circuit 212b may transmit the data signal DQ including the data DATA based on the toggle timing of the data strobe signal DQS. Accordingly, the data DATA may be aligned at the toggle timing of the data strobe signal DQS and transmitted to the storage controller 210.

In a data DATA input operation of the non-volatile memory 220, when the data signal DQ including the data DATA is received from the storage controller 210, the memory interface circuit 212b may receive the toggling data strobe signal DQS together with the data DATA from the storage controller 210. The memory interface circuit 212b may acquire the data DATA from the data signal DQ on the basis of the toggle timing of the data strobe signal DQS. For example, the memory interface circuit 212b may acquire the data DATA by sampling the data signal DQ at a rising edge and a falling edge of the data strobe signal DQS. For example, the memory interface circuit 212b may acquire the data DATA by sampling the data signal DQ during a period between the rising edge and the falling edge of the data strobe signal DQS.

The memory interface circuit 212b may transmit a ready/busy output signal nR/B to the storage controller 210 through an eighth pin P18. The memory interface circuit 212b may transmit the status information of the non-volatile memory 220 to the storage controller 210 through the ready/busy output signal nR/B. When the non-volatile memory 220 is in a busy status (for example, when the internal operations of the non-volatile memory 220 are being performed), the memory interface circuit 212b may transmit the ready/busy output signal nR/B indicating the busy status to the storage controller 210. When the non-volatile memory 220 is in a ready status (e.g., the internal operations of the non-volatile memory 220 are not performed or are completed), the memory interface circuit 212b may transmit the ready/busy output signal nR/B indicating the ready status to the storage controller 210.

For example, while the non-volatile memory 220 reads the data DATA from the memory cell array 520 in response to a page read command, the memory interface circuit 212b may transmit the ready/busy output signal nR/B indicating the busy status (e.g., a low level) to the storage controller 210. For example, while the non-volatile memory 220 programs (e.g., writes) the data DATA to the memory cell array 520 in response to the program command, the memory interface circuit 212b may transmit the ready/busy output signal nR/B indicating the busy status to the storage controller 210.

The control logic circuit 510 may generally control various operations of the non-volatile memory 220. The control logic circuit 510 may receive the command/address CMD/ADDR acquired from the memory interface circuit 212b. The control logic circuit 510 may generate control signals for controlling other constituent elements of the non-volatile memory 220 in accordance with the received command/address CMD/ADDR. For example, the control logic circuit 510 may generate various control signals for programing the data DATA in the memory cell array 520 or reading the data DATA from the memory cell array 520.

The memory cell array 520 may store the data DATA acquired from the memory interface circuit 212b under the control of the control logic circuit 510. The memory cell array 520 may output the stored data DATA to the memory interface circuit 212b under the control of the control logic circuit 510.

The memory cell array 520 may include a plurality of memory cells. For example, the plurality of memory cells may be flash memory cells. However, the present disclosure is not limited thereto, and the memory cells may include RRAM (Resistive Random Access Memory) cells, FRAM (Ferroelectric Random Access Memory) cells, PRAM (Phase Change Random Access Memory) cells, TRAM (Thyristor Random Access Memory) cells, and/or MRAM (Magnetic Random Access Memory) cells. Hereinafter, embodiments of the present disclosure will be described mainly according to an example in which the memory cells are NAND flash memory cells.

The storage controller 210 may include first to eighth pins P21 to P28, and a controller interface circuit 212a. The first to eighth pins P21 to P28 may correspond to the first to eighth pins P11 to P18 of the non-volatile memory 220. For example, the first to eighth pins P21 to P28 may be respectively connected to the first to eighth pins P11 to P18 of the non-volatile memory 220.

The controller interface circuit 212a may transmit the chip enable signal nCE to the non-volatile memory 220 through a first pin P21. The controller interface circuit 212a may transmit and receive signals to and from the non-volatile memory 220, which is selected through the chip enable signal nCE, through the second to eighth pins P22 to P28.

The controller interface circuit 212a may transmit the command latch enable signal CLE, the address latch enable signal ALE, and the write enable signal nWE to the non-volatile memory 220 through the second to fourth pins P22 to P24. The controller interface circuit 212a may transmit the data signal DQ to the non-volatile memory 220 or receive the data signal DQ from the non-volatile memory 220 through a seventh pin P27.

The controller interface circuit 212a may transmit the data signal DQ including the command CMD or the address ADDR to the non-volatile memory 220 along with the toggling write enable signal nWE. The controller interface circuit 212a may transmit the data signal DQ including the command CMD to the non-volatile memory 220 with transmission of the command latch enable signal CLE having the enable status, and may transmit the data signal DQ including the address ADDR to the non-volatile memory 220 with transmission of the address latch enable signal ALE having the enable status.

The controller interface circuit 212a may transmit the read enable signal nRE to the non-volatile memory 220 through a fifth pin P25. The controller interface circuit 212a may receive the data strobe signal DQS from the non-volatile memory 220 and/or may transmit the data strobe signal DQS to the non-volatile memory 220 through a sixth pin P26.

In the data DATA output operation of the non-volatile memory 220, the controller interface circuit 212a may generate a toggling read enable signal nRE, and may transmit the read enable signal nRE to the non-volatile memory 220. For example, the controller interface circuit 212a may generate a read enable signal nRE that changes from the static status (e.g., a high level or a low level) to the toggle status before the data DATA is output. Accordingly, the toggling data strobe signal DQS may be generated in the non-volatile memory 220 based on the read enable signal nRE. The controller interface circuit 212a may receive the data signal DQ including the data DATA along with the toggling data strobe signal DQS from the non-volatile memory 220. The controller interface circuit 212a may acquire the data DATA from the data signal DQ based on the toggle timing of the data strobe signal DQS.

In the data DATA input operation of the non-volatile memory 220, the controller interface circuit 212a may generate the toggling data strobe signal DQS. For example, the controller interface circuit 212a may generate the data strobe signal DQS that changes from the static status (e.g., a high level or a low level) to the toggle status before transmitting the data DATA. The controller interface circuit 212a may transmit the data signal DQ including the data DATA to the non-volatile memory 220 based on the toggle timings of the data strobe signal DQS.

The controller interface circuit 212a may receive the ready/busy output signal nR/B from the non-volatile memory 220 through an eighth pin P28. The controller interface circuit 212a may determine the status information of the non-volatile memory 220 based on the ready/busy output signal nR/B.

Figure 3:
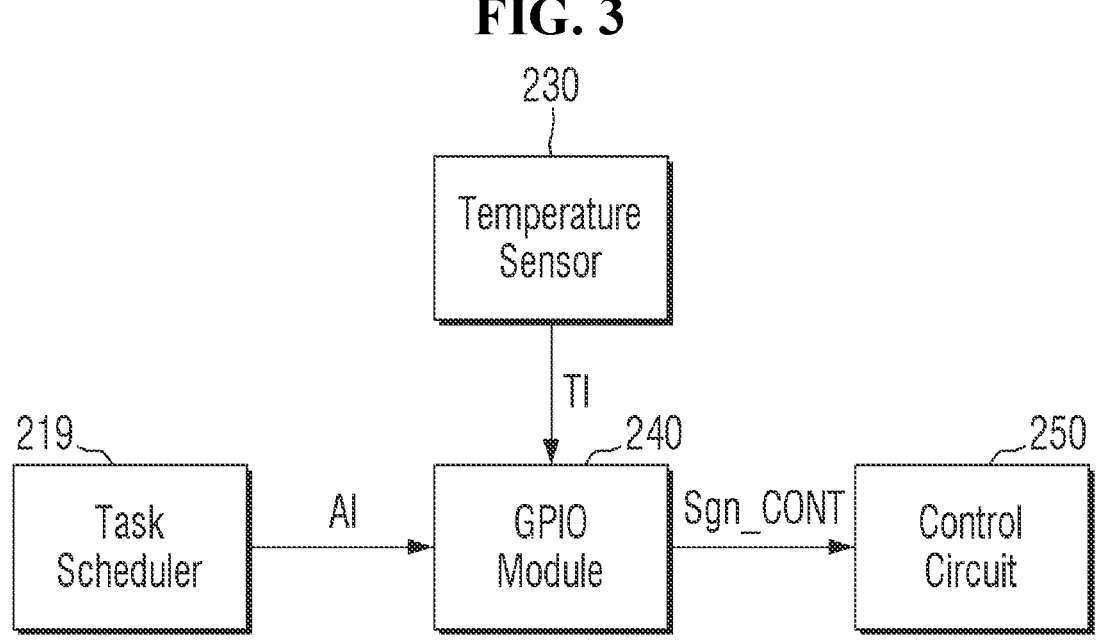
FIG. 3 is a block diagram that shows the operation of the storage device according to some embodiments.

FIG. 3 is a block diagram that shows the operation of the storage device according to some embodiments.

Referring to FIG. 3, the task scheduler 219 may output the access information AI instructing that the memory operation of the non-volatile memory is scheduled to be executed, and provide it to the general purpose input output module 240.

The memory operation of the non-volatile memory may include a read operation of reading the data stored in the non-volatile memory, a write operation of writing the data to the non-volatile memory, and an erase operation of erasing at least a part of the non-volatile memory. However, the embodiments are not limited thereto.

The temperature sensor 230 may measure the temperature of the storage device and provide the temperature information TI on the storage device to the general purpose input output module 240.

The general purpose input output module 240 may output a control signal Sgn_CONT, based on the provided access information AI or temperature information TI, and may supply the output control signal Sgn_CONT to the control circuit 250.

The control circuit 250 may receive the control signal Sgn_CONT from the general purpose input output module 240, and may provide an operating voltage for operating the display device and the fan in accordance with the control signal Sgn_CONT.

Figure 4:
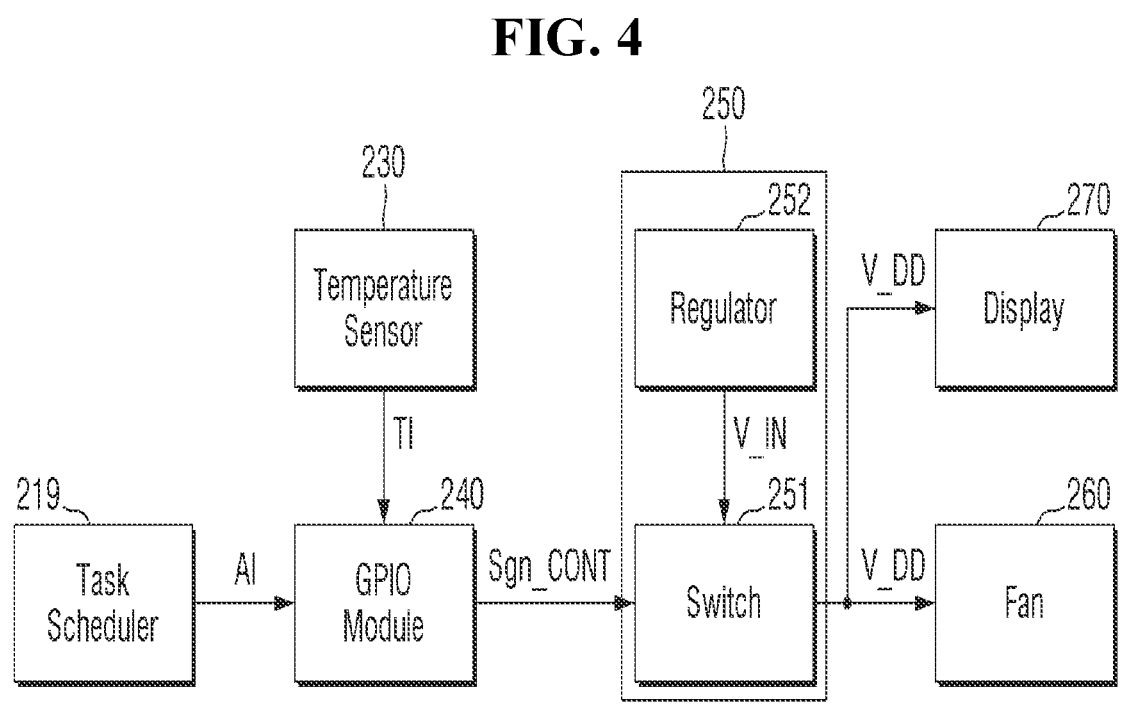

FIG. 4 is a block diagram of the method of controlling a fan and a display device by the operation of the storage device according to some embodiments.

The description of the same or similar components already described with reference to FIG. 3 will be omitted, and additional contents will be mainly described.

Referring to FIG. 4, the control circuit 250 may include a switch 251 and a regulator 252. The switch 251 may receive input of the control signal Sgn_CONT from the general purpose input output module 240. The regulator 252 may provide an input voltage V_IN to the switch 251, and the switch 251 may provide the operating voltage V_DD for operating the fan 260 and the display device 270.

In some embodiments, the switch 251 may include a MOSFET switch. The switch is gated by the received control signal Sgn_CONT and may provide the operating voltage V_DD to the fan 260 and the display device 270.

For example, the control signal Sgn_CONT may output the control signal Sgn_CONT with different voltage levels according to control from the general purpose input output module 240. For example, if the control signal Sgn_CONT having a first voltage level is supplied to the switch 251, the switch 251 may be gated to provide the operating voltage V_DD to the fan 260 and the display device 270. For example, if the control signal Sgn_CONT having a second voltage level lower than the first voltage level is supplied to the switch 251, the switch 251 is not gated, and the operating voltage V_DD may not be provided to the fan 260 and the display device 270.

The regulator 252 may provide the input voltage V_IN such that the switch 251 provides the operating voltage V_DD to the fan 260 and the display device 270. In some embodiments, the regulator 252 may adjust the magnitude of the input voltage V_IN provided to the switch 251 to adjust the magnitude of the operating voltage V_DD provided to the fan 260 and the display.

Figure 5:
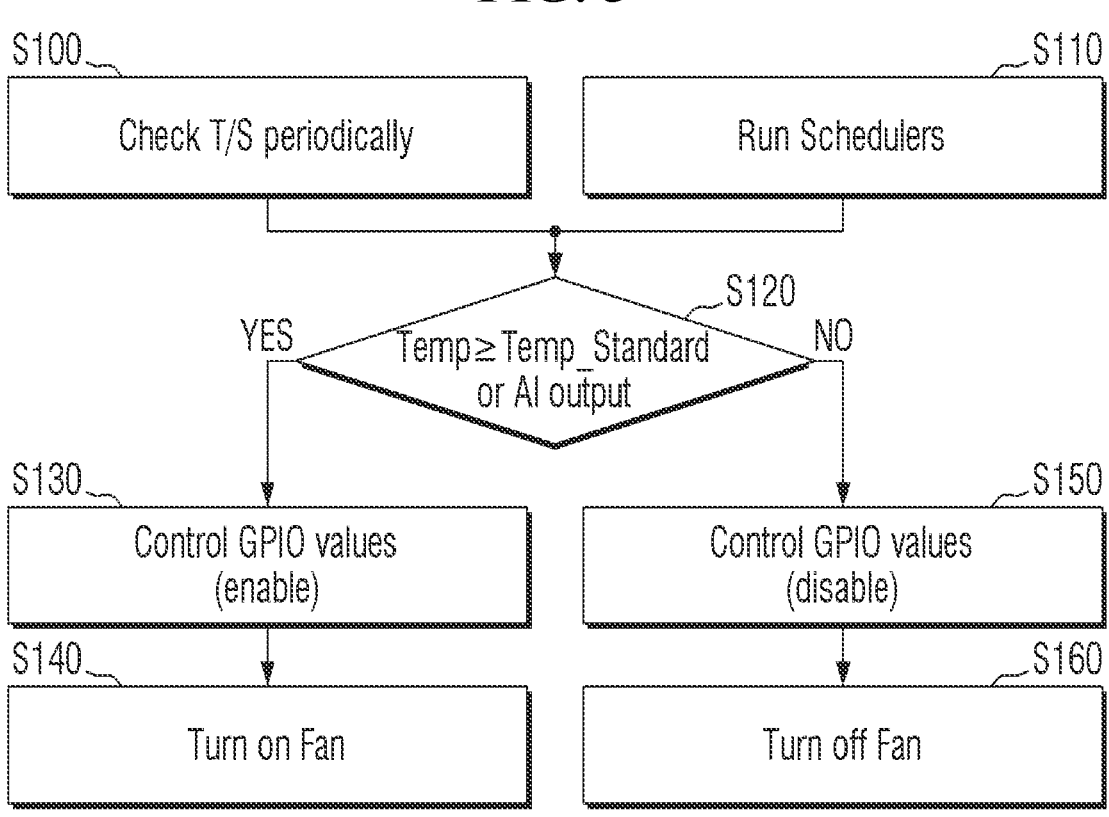
FIG. 5 is a flowchart of the operation of the storage device according to some embodiments.

FIG. 5 is a flowchart of the operation of the storage device according to some embodiments.

The storage device according to some embodiments may periodically sense the temperature of the storage device through a temperature sensor included in the storage device (S100). The storage device according to some embodiments may execute the task scheduler to determine whether a memory operation of the non-volatile memory included in the storage device is scheduled to be executed (S110).

If the temperature of the storage device is higher than a preset reference temperature (S120, YES), or if the task scheduler outputs access information in response to the memory operation on the non-volatile memory being scheduled to be executed (S120, YES), the general purpose input output module may output a control signal having a first voltage level and provides it to the control circuit (S130).

The control circuit may be gated by a control signal having a first voltage level, receive an input voltage from the regulator and supply the operating voltage to the fan. The fan may operate to cool the storage device accordingly (S140).

On the other hand, if the temperature of the storage device is lower than the preset reference temperature (S120, NO), or if the memory operation on the non-volatile memory is not scheduled to be executed and the task scheduler does not output the access information (S120, NO), the general purpose input output module may output a control signal having a second voltage level lower than the first voltage level and provide it to the control circuit (S150).

In this case, the control circuit may not be gated by a control signal having a second voltage level and may not provide the operating voltage to the fan. Accordingly, the fan may stop the operation (S160).

The storage device according to some embodiments may check whether the memory operation on the non-volatile memory is scheduled to be performed through the task scheduler, and may operate the fan before the memory operation is performed. Therefore, the storage device according to some embodiments may prevent the temperature from rising and the performance from rapidly decreasing with the memory operation, and may operate the fan in advance to maintain the temperature of the storage device at a proper temperature and exhibit maximum performance of the system.

Figure 6:
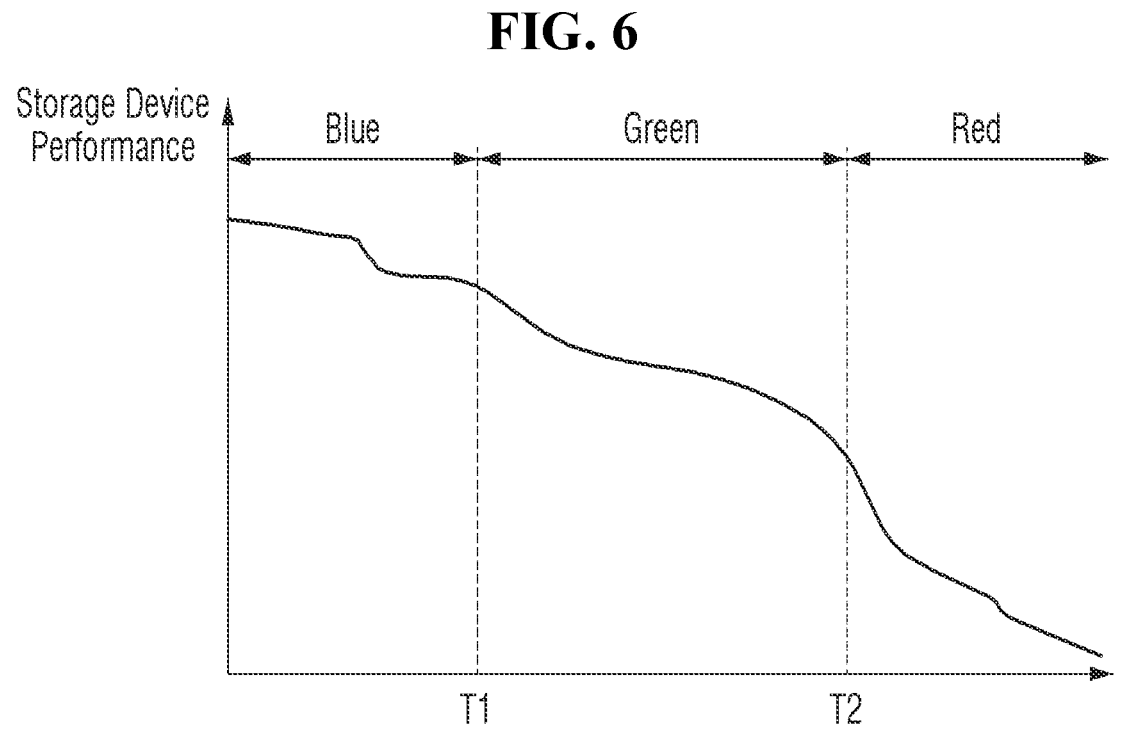

FIG. 6 is a diagram of the operation of the display device according to some embodiments.

In some embodiments, the display device may include, but is not limited to, an LED (Light Emitting Diode). As described above, the operation of the display device may be controlled by the general purpose input output module 240 and the control circuit 250. That is, the display device may be controlled to output light having different colors from each other in a preset temperature section.

For example, the regulator may supply different input voltages to the switch in each section, and the display device may receive different operating voltages in each section and output different colors of light from each other.

For example, referring to FIG. 6, the regulator adjusts the input voltage, and the display device may output blue light in a section lower than a T1 temperature, may output green light in a temperature section that is higher than the T1 temperature and lower than a T2 temperature, and may output red light in a temperature section higher than the T2 temperature. Here, T1 may correspond to 70° C. at which the performance of the storage device is 50% of the maximum performance, and T2 may correspond to 80° C. at which the performance of the storage device is 10% of the maximum performance. However, the color of the light that is output from the display device is not limited to the present embodiment, and the preset temperature is also not limited to the present embodiment.

As described above, the storage device according to some embodiments may sense the temperature of the storage device and control the operation of the display device through the sensed temperature to output light of different colors depending on the temperature change. Accordingly, the user may visually check the temperature of the storage device, be informed of a performance degradation of the storage device due to the temperature rise, and immediately take the necessary follow-up measures.

Figure 7:
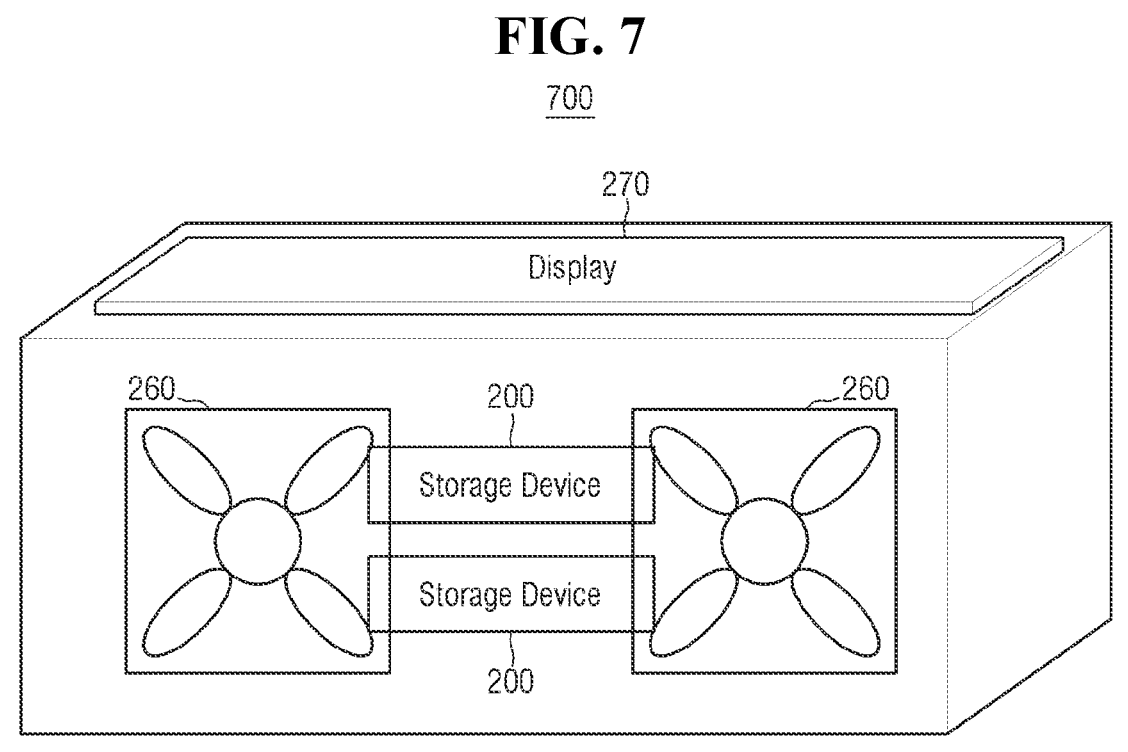

FIG. 7 is a diagram of the storage package including the storage device according to some embodiments.

Referring to FIG. 7, a storage package 700 may include a plurality of storage devices 200, a plurality of fans 260, and a display device 270. The plurality of storage devices 200 included in the storage package 700 may be the storage device according to above-described some embodiments, and the plurality of fans 260 and the display device 270 may be controlled by the storage device according to some embodiments.

The plurality of storage devices 200 and the plurality of fans 260 may be arranged in a structure in which they overlap each other inside the storage package 700. The region in which the plurality of storage devices 200 and the plurality of fans 260 overlap may include a circuit or the like in which control signals for controlling the operation of the plurality of fans 260 by the plurality of storage devices 200 are generated and transmitted.

Figure 8:
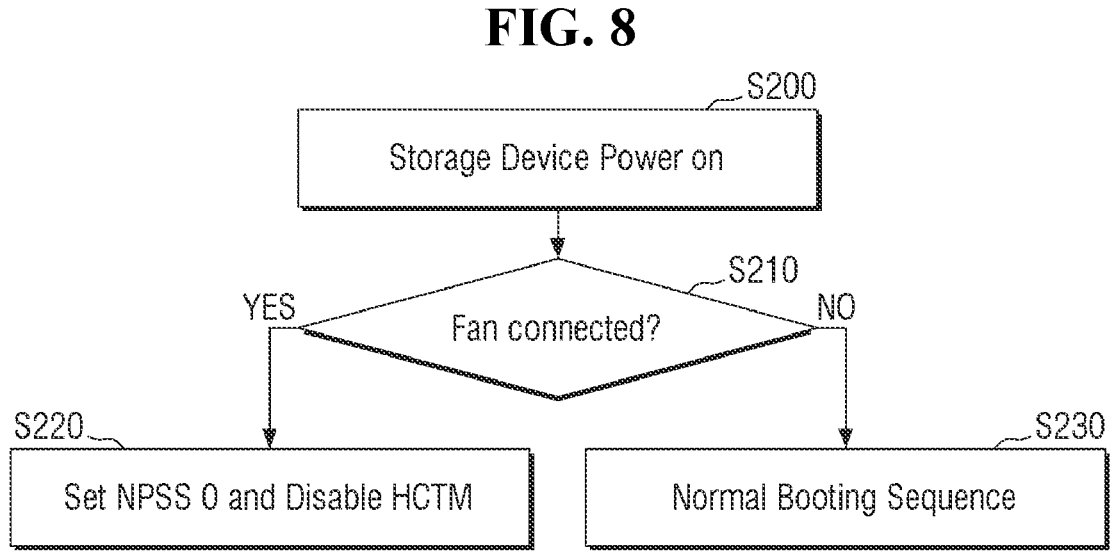
FIG. 8 is a flowchart of the operating method of the storage device according to some embodiments.

FIG. 8 is a flowchart of the operating method of the storage device according to some embodiments.

The storage device according to the above-described some embodiments may operate the fan by itself to lower the temperature. Further, the storage device according to some of the above-described embodiments may operate such that the temperature of the storage device is maintained at the optimum temperature, by operating the fan in advance before the temperature of the storage device rises due to the memory operation through the task scheduler. Therefore, the storage device may be set to maintain maximum performance at all times. Accordingly, the performance of a computing system that includes the storage device according to the present disclosure may have increased performance.

For example, referring to FIG. 8, a power may be supplied to the storage device first (S200).

After that, it is possible to check whether the storage device is connected to the fan (S210). For example, the storage device may check the connection with the fan through the level of the signal that is input through the general purpose input output module included in the storage device. In this example, the general purpose input output module may be set to an input mode, receive input of different levels of signal depending on whether it is connected to the fan, and may check whether the fan is connected based on the input signal. For example, when a signal having the first level is received, it may correspond to a status in which the fan is connected, and when a signal having the second level lower than the first level is input, it may correspond to a status in which the fan is not connected.

The general purpose input output module for checking whether the fan is connected may have the same configuration as the general purpose input output module that outputs a control signal for controlling the operation of the fan and the display device described above. For example, the control of the fan and display operation, and the operation of checking whether the fan is connected, may use different pins from each other among a plurality of pins included in the same general purpose input output module, and each operation may be performed independently of each other. However, the embodiments are not limited thereto.

When the storage device and the fan are connected, the storage device may set a power state (NPSS), which is supported to the host, to a $0^{th}$ power state in the process of booting, and may control a temperature management feature (HCTM Feature; Host Controlled Temperature Management) on the storage device of the host to a disabled status (S220). On the other hand, when the storage device and the fan are not connected, the storage device may perform a general booting process (S230).

The power state may mean a setting of the storage device that determines the performance and power of the storage device. The power state may include a plurality of power states. For example, the power state may include a $0^{th}$ power state NPSS 0 to an $N^{th}$ power state NPSS N (N is a natural number of 1 or more), and as the value of N increases, the power state may correspond to changes in the storage device in which the power consumption and performance are reduced. In general, in the storage device, the power state may include, but is not limited to, the $0^{th}$ power state to a third power state.

The host may send commands to the storage device to check the power state settings and the temperature management feature status of the storage device. Accordingly, the storage device may independently maintain its temperature through the operation control of the fan.

The storage device according to some embodiments may be controlled so that the temperature of the storage device is maintained independently at a temperature which allows the maximum performance to be exhibited. The storage device may exhibit the maximum performance by providing only the $0^{th}$ power state to the host based on this independent maintenance of the temperature.

Figure 9:
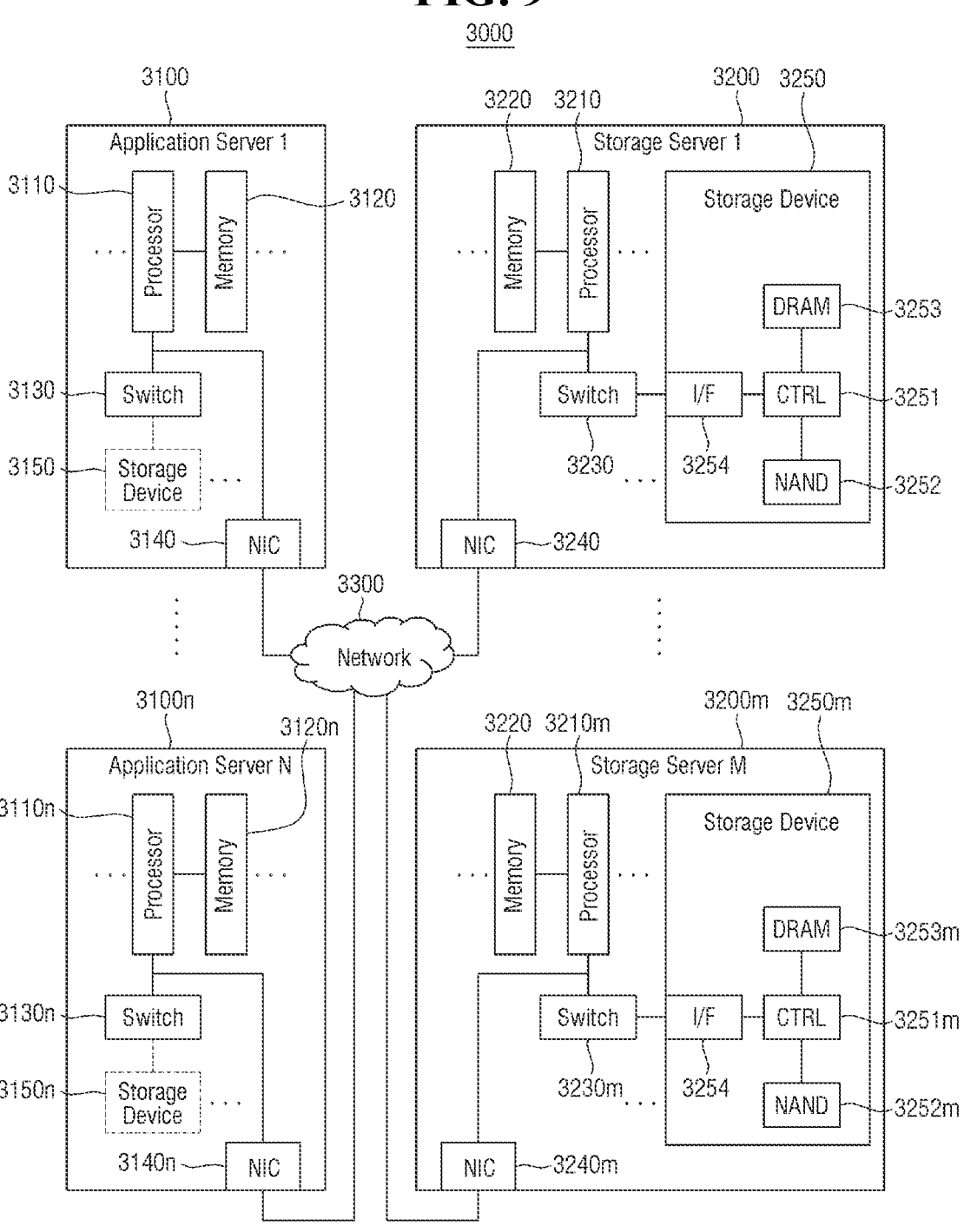
FIG. 9 is a diagram that shows the data center to which the storage device according to some embodiments is applied.

FIG. 9 is a diagram which shows the data center to which the storage device according to some embodiments is applied.

Referring to FIG. 9, a data center 3000 is a facility that gathers various types of data and provides services, and may also be called a data storage center. The data center 3000 may be a search engine and a system for database operation, and may be a computing system used by corporations such as banks or government agencies. The data center 3000 may include application servers 3100 to 3100n and storage servers 3200 to 3200m. The number of application servers 3100 to 3100n and the number of storage servers 3200 to 3200m may vary according to embodiments, and the number of application servers 3100 to 3100n and the number of storage servers 3200 to 3200m may be different from each other.

The application server 3100 or the storage server 3200 may include at least one of processors 3110 and 3210 and memories 3120 and 3220. Taking the storage server 3200 as an example, the processor 3210 may control the overall operation of the storage server 3200, and access the memory 3220 to execute command language and/or data loaded into the memory 3220. The memory 3220 may be a DDR SDRAM (Double Data Rate Synchronous DRAM), a HBM (High Bandwidth Memory), a HMC (Hybrid Memory Cube), a DIMM (Dual In-line Memory Module), an Optane DIMM and/or a NVMDIMM (Non-Volatile DIMM). According to the embodiments, the number of processors 3210 and the number of memories 3220 included in the storage server 3200 may be variously selected.

In an embodiment, the processor 3210 and the memory 3220 may provide a processor-memory pair. In an embodiment, the number of processors 3210 and the number of memories 3220 may be different from each other. The processor 3210 may include a single core processor or a multi-core processor. The aforementioned explanation of the storage server 3200 may also be similarly applied to the application server 3100. According to the embodiments, the application server 3100 may not include a storage device 3150. The storage server 3200 may include at least one or more storage devices 3250. The number of storage devices 3250 included in the storage server 3200 may vary on the embodiments.

The application servers 3100 to 3100n and the storage servers 3200 to 3200m may communicate with each other through a network 3300. The network 3300 may be implemented, using a FC (Fibre Channel), Ethernet, or the like. At this time, FC is a medium used for a relatively high-speed data transfer, and may use an optical switch that provides high performance/high availability. The storage servers 3200 to 3200m may be provided as a file storage, a block storage or an object storage, depending on the access type of the network 3300.

In an embodiment, the network 1300 may be a storage-only network such as a SAN (Storage region Network). For example, a SAN may be an FC-SAN which uses an FC network and is implemented according to FCP (FC Protocol). In an embodiment, a SAN may be an IP-SAN which uses a TCP/IP network and is implemented according to an iSCSI (SCSI over TCP/IP or Internet SCSI) protocol. In an embodiment, the network 1300 may be a general network such as a TCP/IP network. For example, the network 1300 may be implemented, according to protocols such as an FCoE (FC over Ethernet), a NAS (Network Attached Storage), and an NVMe-oF (NVMe over Fabrics).

Hereinafter, the application server 3100 and the storage server 3200 will be mainly described. Description and explanation of the application server 3100 may also be applied to another application server 3100n, and similarly, description and explanation of the storage server 3200 may also be applied to another storage server 3200m.

The application server 3100 may store the data requested to be stored by a user or client in one of the storage servers 3200 to 3200m through the network 3300. Further, the application server 3100 may acquire the data requested to read by the user or client from one of the storage servers 3200 to 3200m through the network 3300. For example, the application server 3100 may be implemented by a Web server, a DBMS (Database Management System) or the like.

The application server 3100 may access a memory 3120n or a storage device 3150n included in another application server 3100n through the network 3300, or may access the memories 3220 to 3220m or the storage devices 3250 to 3250m included in the storage servers 3200 to 3200m through the network 3300. Accordingly, the application server 3100 may perform various operations on the data stored in the application servers 3100 to 3100n and/or the storage servers 3200 to 3200m. For example, the application server 3100 may execute commands for moving or copying the data between the application servers 3100 to 3100n and/or the storage servers 3200 to 3200m. For example, the data may be moved from the storage devices 3250 to 3250m of the storage servers 3200 to 3200m via the memories 3220 to 3220m of the storage servers 3200 to 3200m, or may be directly moved to the memories 3120 to 3120n of the application servers 3100 to 3100n. Data that moves through the network 3300 may be encrypted for security and privacy.

Taking the storage server 3200 as an example, an interface 3254 may provide a physical connection between the processor 3210 and a controller 3251, and a physical connection between the NIC (network interface card) 3240 and the controller 3251. For example, the interface 3254 may be implemented by a DAS (Direct Attached Storage) type in which the storage device 3250 is directly connected with a dedicated cable. Further, for example, the interface 3254 may be implemented by various interface types, such as an ATA (Advanced Technology Attachment), a SATA (Serial ATA), an e-SATA (external SATA), a SCSI (Small Computer Small Interface), a SAS (Serial Attached SCSI), a PCI (Peripheral Component Interconnection), a PCIe (PCI express), a NVMe (NVM express), an IEEE 1394, a USB (universal serial bus), an SD (secure digital) card, a MMC (multi-media card), an eMMC (embedded multi-media card), a UFS (Universal Flash Storage), an eUFS (embedded Universal Flash Storage), and/or a CF (compact flash) card interface.

The storage server 3200 may further include a switch 3230 and a NIC 3240. The switch 3230 may selectively connect the processor 3210 and the storage device 3250 or may selectively connect the NIC 3240 and the storage device 3250, according to the control of the processor 3210.

In an embodiment, the NIC 3240 may include a network interface card, a network adapter, and the like. The NIC 3240 may be connected to the network 3300 by a wired interface, a wireless interface, a Bluetooth interface, an optical interface, or the like. The NIC 3240 may include an internal memory, a DSP, a host bus interface, or the like, and may be connected to the processor 3210 and/or the switch 3230, or the like through the host bus interface. The host bus interface may also be implemented as one of the examples of the interface 3254 described above. In an embodiment, the NIC 3240 may also be integrated with the processor 3210, the switch 3230, and/or the storage device 3250.

In the storage servers 3200 to 3200m or the application servers 3100 to 3100n, the processors 3110 and 3210 may transmit the commands to the storage devices 3130 to 3130n and 3250 to 3250m or to the memories 3120 to 3120n and 3220 to 3220m to program (e.g., write) or read the data. The data may be data in which an error is corrected through an ECC (Error Correction Code) engine. The data may be subjected to data bus inversion (DBI) or data masking (DM) process, and may include CRC (Cyclic Redundancy Code) information. The data may be data that is encrypted for security and privacy.

The storage devices 3150 to 3150m and 3250 to 3250m may transmit the control signal and command/address signal to the NAND flash memory devices 3252 to 3252m in response to the read command received from the processor. Accordingly, when data is read from the NAND flash memory devices 3252 to 3252m, the RE (Read Enable) signal is input as a data output control signal, and may serve to output the data to the DQ bus. A DQS (Data Strobe) may be generated, using the RE signal. Commands and address signals may be latched to the page buffer, depending on a rising edge or a falling edge of a WE (Write Enable) signal.

The controller 3251 may generally control the operation of the storage device 3250. In an embodiment, the controller 3251 may include a SRAM (Static Random Access Memory). The controller 3251 may write data in the NAND flash 3252 in response to a write command, or may read the data from the NAND flash 3252 in response to a read command. For example, the write command and/or the read command may be provided from the processor 3210 in the storage server 3200, a processor 3210m in another storage server 3200m or the processors 3110 and 3110n in the application servers 3100 and 3100n. A DRAM 3253 may temporarily store (buffer) the data to be written in the NAND flash 3252 or the data that is read from the NAND flash 3252. Also, the DRAM 3253 may store meta data. The meta data may be user data or data generated by the controller 3251 to manage the NAND flash 3252. The storage device 3250 may include an SE (Secure Element) for security and privacy.

In some embodiments, the storage device 3250 to the storage device 3250m may adopt the above-mentioned storage device.

In concluding the detailed description, those skilled in the art will appreciate that many variations and modifications may be made to the embodiments without departing from the principles of the present disclosure. Therefore, the disclosed embodiments of the disclosure are used in a generic and descriptive sense only and not necessarily for purposes of limitation.

What is claimed is:

1. A storage package comprising:

a fan;

a display device; and a storage device which includes a non-volatile memory, and is configured to:

check whether the storage device and the fan are connected;

modify a power state of the storage device based on whether the fan is connected;

determine whether a host controlled temperature management feature on the storage device operates based on whether the fan is connected; and output a control signal based on a temperature of the storage device and/or based on an indication of scheduled memory operations on the non-volatile memory, wherein the storage device includes a control circuit configured to control an operation of the fan and/or the display device based on the control signal, wherein the control circuit is configured to control the display device to output light having different colors, each color corresponding to one of first to third temperature sections, responsive to the temperature of the storage device being within a range of any one of the first to third temperature sections, and wherein the control circuit is configured to operate the fan to cool the storage device responsive to the temperature of the storage device exceeding a preset reference temperature or responsive to a command to perform the scheduled memory operations on the non-volatile memory.

2. The storage package of claim 1, wherein the storage device further comprises:

a temperature sensor configured to measure the temperature of the storage device;

a task scheduler configured to output access information indicating that the scheduled memory operations are scheduled to be executed; and a general purpose input output module configured to output a control signal for controlling the operation of the fan and/or the display device responsive to the access information, and/or responsive to the temperature of the storage device exceeding the preset reference temperature.

3. The storage package of claim 2, wherein the control circuit comprises:

a switch configured to receive the control signal from the general purpose input output module, and to provide an operating voltage to the fan and/or the display device; and a regulator configured to provide an input voltage to the switch.

4. The storage package of claim 3, wherein the switch includes a MOSFET switch, and wherein, when the general purpose input output module is set to an output mode, the general purpose input output module provides the switch with the control signal having a first voltage level or a second voltage level lower than the first voltage level, and wherein the switch is gated by the control signal.

5. The storage package of claim 4, wherein the general purpose input output module outputs the control signal of the first voltage level responsive to the task scheduler outputting the access information, wherein when the switch receives the control signal of the first voltage level and the input voltage, the switch provides the operating voltage to the fan, and operates the fan, and wherein, in responsive to the task scheduler outputting no access information, the general purpose input output module outputs the control signal of the second voltage level, and the switch receives the control signal of the second voltage level and stops the operation of the fan.

6. The storage package of claim 4, wherein responsive to the temperature of the storage device exceeding the preset reference temperature, the general purpose input output module outputs the control signal of the first voltage level, the switch receives the control signal of the first voltage level and the input voltage, provides the operating voltage to the fan, and operates the fan, and responsive to the temperature of the storage device being below the preset reference temperature, the general purpose input output module outputs the control signal of the second voltage level, and the switch receives the control signal of the second voltage level and stops the operation of the fan.

7. The storage package of claim 1, wherein the power state includes a plurality of power states, including a 0th power state through an Nth power state, wherein N is a positive integer, wherein, with a decrease from the Nth power state to the 0th power state, power consumption of the storage package increases, wherein, in response to an existing connection between the storage device and the fan, the storage device is configured to set the power state to the 0th power state, and wherein the storage device is configured to control the host controlled temperature management feature in a disabled status.

8. The storage package of claim 1, comprising:

at least two or more fans; and at least two or more storage devices, wherein the at least two or more fans and the at least two or more storage devices are placed in an overlap structure to each other.

9. The storage package of claim 1, wherein the scheduled memory operations comprise:

a read operation of reading data stored in the non-volatile memory;

a write operation of writing data to the non-volatile memory; and an erase operation of erasing at least a part of the non-volatile memory.

10. A storage device comprising:

a non-volatile memory;

a storage controller configured to:

check whether the storage device and a fan are connected;

modify a power state of the storage device based on whether the fan is connected; and determine whether a host controlled temperature management feature on the storage device operates based on whether the fan is connected; and a temperature sensor configured to measure a temperature of the storage device and to output temperature information, wherein the storage controller includes:

a task scheduler configured to output access information indicating that a memory operation on the non-volatile memory is scheduled to be executed, the access information output in response to a command for executing the memory operation on the non-volatile memory; and a general purpose input output module configured to output a control signal to control an operation of the fan and/or a display device, responsive to a temperature of the storage device exceeding a preset reference temperature and/or to the output of the access information.

11. The storage device of claim 10, wherein the storage controller further comprises:

a control circuit configured to control the operation of the fan or the display device, wherein, when the general purpose input output module is set to an output mode, the general purpose input output module provides the control circuit with the control signal having a first voltage level or a second voltage level lower than the first voltage level, and wherein the control circuit is configured to receive the control signal from the general purpose input output module and to provide an operating voltage the fan and/or the display device.

12. The storage device of claim 11, wherein, responsive to the task scheduler outputting the access information, the general purpose input output module outputs the control signal of the first voltage level, the control circuit receives the control signal of the first voltage level, provides the operating voltage to the fan, and operates the fan, and responsive to the task scheduler outputting no access information, the general purpose input output module outputs the control signal of the second voltage level, and the control circuit receives the control signal of the second voltage level and stops the operation of the fan.

13. The storage device of claim 11, wherein, responsive to the temperature information being above a preset first reference temperature, the general purpose input output module outputs the control signal of the first voltage level, the control circuit receives the control signal of the first voltage level, provides the operating voltage to the fan, and operates the fan, and responsive to the temperature information being below the preset first reference temperature, the general purpose input output module outputs the control signal of the second voltage level, and the control circuit receives the control signal of the second voltage level and stop the operation of the fan.

14. The storage device of claim 10, wherein the power state includes a plurality of power states, including 0th power state through an Nth power state, wherein N is a positive integer, wherein, with a decrease from the Nth power state to the 0th power state, power consumption increases, and wherein, in response to determining a connection between the storage device and the fan, the storage controller sets the power state to the 0th power state, and wherein the storage controller is configured to control the host controlled temperature management feature in a disabled status.

15. A method for operating a storage device, the method comprising:

providing the storage device which includes a non-volatile memory, and is configured to output a control signal based on a temperature of the storage device, or on an indication of scheduled memory operations on the non-volatile memory;

providing a fan which is operated based on the control signal;

checking whether the storage device and the fan are connected;

modifying a power state of the storage device based on whether the fan is connected; and determining whether a host controlled temperature management feature on the storage device operates based on whether the fan is connected.

16. The method for operating the storage device of claim 15, wherein the power state includes a plurality of power states including a 0th power state through an Nth power state, wherein N is a natural number of 1 or more, wherein, with a decrease from the Nth power state to the 0th power state, power consumption of the storage device increases, and wherein, in response to determining an existing connection between the storage device and the fan, the power state is set to the 0th power state, and the host controlled temperature management feature is controlled in a disabled status.

17. The method for operating the storage device of claim 16, wherein the storage device comprises:

a task scheduler configured to output access information indicating that the scheduled memory operations are scheduled to be executed; and a temperature sensor configured to measure the temperature of the storage device, wherein, responsive to the task scheduler outputting the access information or to the temperature of the storage device being equal to or higher than a preset reference temperature, a storage controller is configured to operate the fan, using the control signal.

18. The method for operating the storage device of claim 15, wherein the scheduled memory operations comprise:

a read operation of reading data stored in the non-volatile memory;

a write operation of writing data to the non-volatile memory; and an erase operation of erasing at least a part of the non-volatile memory.

* * * * *